US008010587B2

(12) United States Patent
Kumar et al.

(10) Patent No.: US 8,010,587 B2
(45) Date of Patent: Aug. 30, 2011

(54) RANDOM NUMBER GENERATOR

(75) Inventors: Mohan J. Kumar, Aloha, OR (US);
Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1027 days.

(21) Appl. No.: 11/899,574

(22) Filed: Sep. 6, 2007

(65) Prior Publication Data

US 2009/0067618 A1     Mar. 12, 2009

(51) Int. Cl.
*G06F 1/02* (2006.01)
(52) U.S. Cl. ........................................ 708/250; 708/254
(58) Field of Classification Search .................. 708/350, 708/254
See application file for complete search history.

(56) References Cited

U.S. PATENT DOCUMENTS

| 7,007,050 | B2 * | 2/2006 | Saarinen ........................ 708/250 |
| 7,813,503 | B2 * | 10/2010 | Campagna et al. ............. 380/44 |
| 2002/0165888 | A1 * | 11/2002 | Kim ............................. 708/250 |
| 2006/0002550 | A1 * | 1/2006 | Campagna et al. ............. 380/46 |
| 2006/0126842 | A1 * | 6/2006 | Campagna et al. ........... 380/258 |

* cited by examiner

*Primary Examiner* — Chuong D Ngo
(74) *Attorney, Agent, or Firm* — D'Ann Naylor Rifai

(57) ABSTRACT

Systems, methods, and other embodiments associated with random number generators are described. One system embodiment includes a random number generator logic that may produce an initial random number from a first set of three inputs. The system embodiment may receive the three inputs from sources including an internal counter entropy source (ICES), an internal arbitrary entropy source (IAES), and an external entropy source (EES). The system embodiment may generate a first random number from a first set of three inputs (e.g., value from ICES, value from IAES, value from EES) but may then generate subsequent random numbers from a different set of three inputs (e.g., value from ICES, value from IAES, previous random number).

15 Claims, 4 Drawing Sheets

RANDOM NUMBER GENERATOR

TECHNICAL FIELD

Embodiments of the invention relate to a random number generator (RNG) located in a central processing unit (CPU). At least one embodiment of the invention relates to a random number generator in a CPU where the random number generator is independent of computer platform components.

BACKGROUND

Conventionally, a random number generator may have required an analog entropy source. Without an analog entropy source, the random number generator may have been predictable. Thus, some random number generators may have received an analog entropy input from a platform component. These platform components may have been limited by their deployment (e.g., geographic key escrow issues, OEM enablement decisions).

Conventional random number generators may have relied on various algorithms to produce a random number. These conventional random number generators may have been vulnerable to attack when an attacker had knowledge of the algorithm being employed. These conventional random number generators may also have been vulnerable to attack when a bit stream used by the random number generator could be captured and/or replayed.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries.

DETAILED DESCRIPTION

Figure 1:
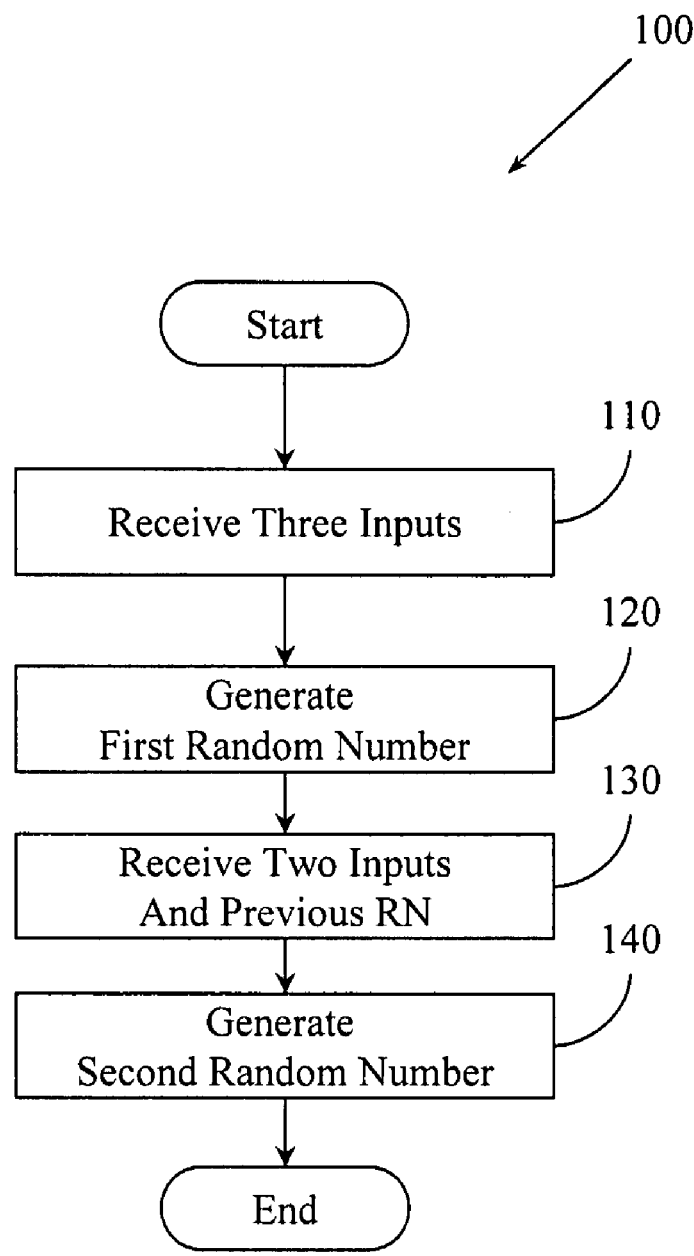
FIG. 1 is a block diagram illustrating a method for producing a random number in accordance with at least some aspects of the invention.

One embodiment of the invention provides an apparatus for generating a random number (RN). The apparatus may be embodied in a central processing unit (CPU). In one embodiment, the random number may be generated by circuit logic independent of other platform components. For example, a random number generator logic may not require inputs from traditional platform components. Additionally, the random number generator logic may not require an analog entropy sources (e.g., clock drift, disk drives, keyboard, thermal noise of electronic components). In different embodiments the random number generator logic may receive values from different digital entropy sources. For example, the random number generator logic may receive externally generated random numbers, values associated with internal counters, and values associated with internal arbitrary entropy sources. These may be digital sources.

In one example, a system may include downstream consumers of a random number produced by the random number generator logic. For example, the random number may be consumed by a nonce generation logic, a padding generation logic, a pad (e.g., one time pad) generation logic, a secure channel establishment logic, and so on. The system may also write the random number to memory, write the random number to a computer-readable medium, display the random number, and so on.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment, though it may.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. Where multiple logical logics are described, it may be possible in some examples to incorporate the multiple logical logics into one physical logic. Similarly, where a single logical logic is described, it may be possible in some examples to distribute that single logical logic between multiple physical logics.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads code from dynamically linked libraries, objects, functions (local and/or remote), servelets, applets, instructions stored in a memory, and so on.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times to refer to these electrical and/or magnetic signals as bits, values, elements, symbols, characters, terms, numbers, and so on. These and similar terms are associated with appropriate physical quantities and are convenient labels applied to these quantities. It is to be appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions.

FIG. 1 illustrates a method 100 to generate a set of random numbers according to one embodiment of the invention. Method 100 may be used to provide random numbers to other logics and/or software. In one embodiment a first set of three inputs are received at 110. A first random number is then generated at 120. The random number may be generated by applying a random number generator (RNG) function to the first set of three inputs. The random number generator function may involve processing the inputs using, for example, an AES cipher, a cryptographic hash function, a keyed MAC algorithm, and so on. One example cryptographic hash function is SHA256 (FIPS 180-2). While three random number generating functions are described, it is to be appreciated that other functions (e.g., hash functions) may be employed.

The first set of three inputs may include an externally generated value (EGV). "External" refers to being outside a CPU in which method 100 is performed. This EGV may be provided by an encrypted authentication code module (EACM). A cryptographically secure random number generator (CSRNG) is used to generate the value seeded in EACM thus ensuring a true random seed. The EGV may then be loaded into a processor in which method 100 is performed. The EGV may be loaded into the processor when the processor is reset. This input may be referred to as a key (K). The process by which the key is loaded in to the processor is secure thus ensuring that the EGV value cannot be recovered by a malicious attacker.

The first set of three inputs may also include a value associated with an internal counter entropy source (ICES). "Internal" refers to being in the CPU in which method 100 is performed. The ICES may be, for example, a monotonic counter. The monotonic counter may itself have been initialized based on some entropy source. This input may be referred to as a counter (C).

The first set of three inputs may also include a value associated with an internal arbitrary entropy source (IAES). In one example, the value provided by the IAES may be based, at least in part, on parity bits processed in a reorder buffer in the CPU in which method 100 is performed. While parity bits associated with a reorder buffer are described, it is to be appreciated that other entropy sources may be employed. This input may be referred to as an arbitrary entropy (AE).

Thus, three digital entropy sources are available to provide input values to method 100. These three values may be received at 110. In one example this may be referred to as:
INPUT (K, AE, C)

The three values may then be processed at 120 to generate the first random number. In one example the number generated at a time $T_1$ may be referred to as:

$$T_1 = H(K\|C\|AE).$$

A subsequent random number may then be generated at 140. The subsequent random number may be generated at a time $T_N$. The subsequent random number may be generated by applying a random number generator function to a subsequent set of three inputs received at 130. This subsequent set of three inputs will differ from the first set of three inputs both in source and value. By way of illustration, one of the inputs in the subsequent set of three inputs may be a previously generated random number. This input may be referred to as $T_{(N-1)}$. One of the subsequent inputs may be a value associated with the ICES (e.g., C) and one of the subsequent inputs may be a value associated with the IAES (e.g., AE). Thus, method 100 computes a first random number at 120 using a first set of three inputs, including one external input, and then computes subsequent random numbers at 140 using different sets of three inputs, including a previously generated random number. The subsequent random number may be referred to as:

$$T_{(N+1)} = H(T_N\|C\|AE).$$

While TN is described, it is to be appreciated that other previously generated random numbers may be employed.

Figure 2:
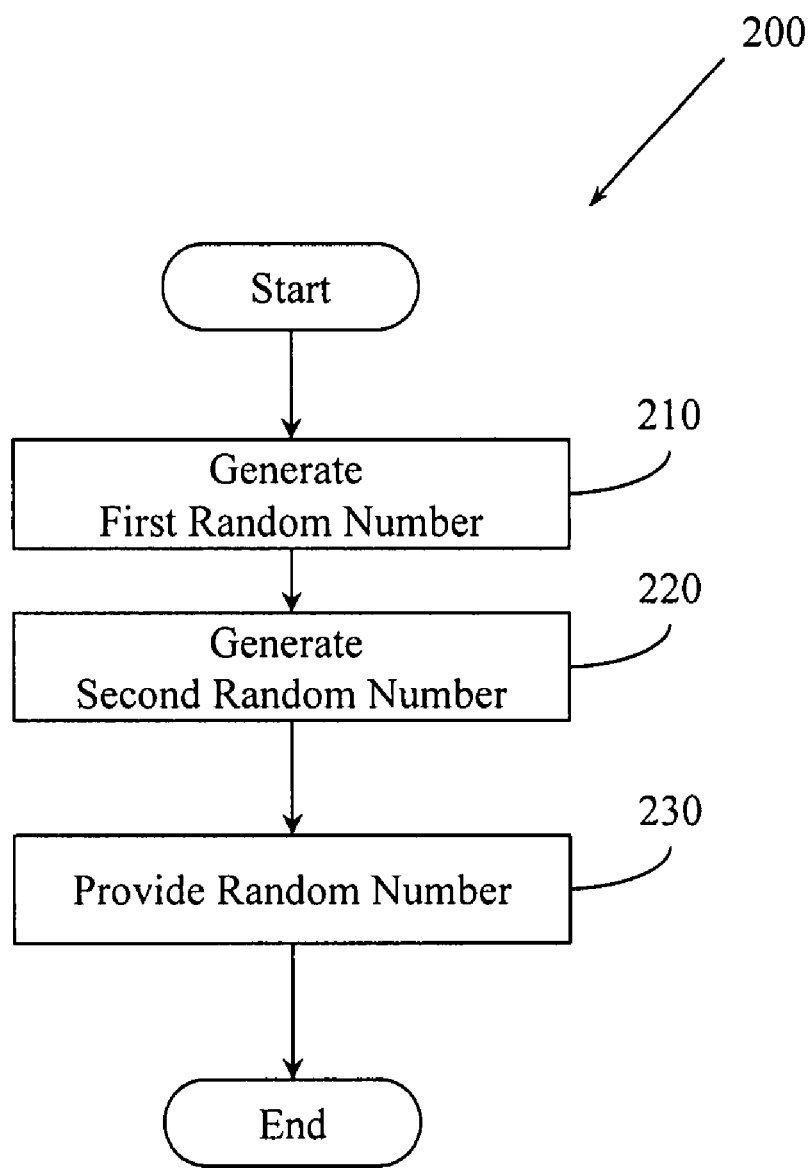
FIG. 2 is a block diagram illustrating a method for producing a random number in accordance with at least some aspects of the invention.

FIG. 2 illustrates a method 200 for generating and providing random numbers. Method 200 may provide random numbers to logics seeking random number inputs. Method 200 includes some actions similar to those described in connection with method 100 (FIG. 1). For example, method 200 includes generating a first random number at 210 from a first set of three inputs and generating a second random number at 220 from a second set of three inputs, including a previously generated random number. Additionally, method 200 includes providing a random number at 230. The random number may be provided to different logics. In one embodiment these logics may include a nonce generation logic, a padding generation logic, a one time pad generation logic, a secure connection establishment logic, and so on. One with ordinary skill in the art would appreciate that a random number generated by method 200 could be provided as an input to various logics or software that take random numbers as an input. Providing the random number at 230 may also include storing the random number in memory, writing the random number to a computer-readable medium, displaying the random number, and so on.

In one example, the processing performed by method 100 (FIG. 1) and/or method 200 (FIG. 2) may be invokable through an instruction. For example, an instruction stored in a memory may be provided to a processor to control the processor to generate and/or provide a set of random numbers using method 100 and/or method 200.

Figure 3:
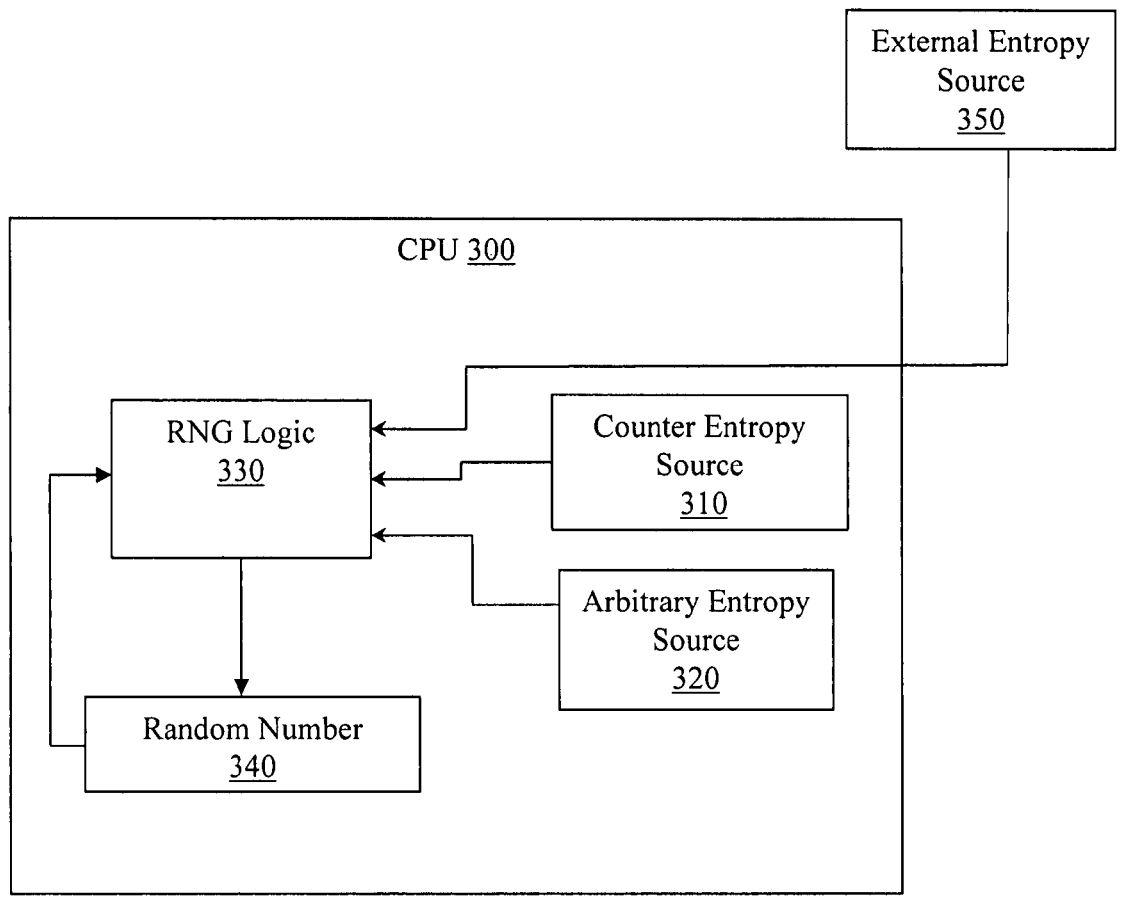
FIG. 3 is a block diagram illustrating a central processing unit (CPU) having at least some aspects of at least one embodiment of the invention.

FIG. 3 illustrates a central processing unit (CPU) 300. CPU 300 may produce random numbers. In one embodiment, the CPU 300 may include a counter entropy source 310. The counter entropy source 310 may be based, for example, on a monotonic counter. While an internal monotonic counter is described, it is to be appreciated that other internal counters may be employed. The CPU 300 may also include an arbitrary entropy source 320. In one example, the arbitrary entropy source 320 may provide a value associated with processing parity bits in a reorder buffer in CPU 300. While the arbitrary entropy source 320 is described being associated with parity bits in a reorder buffer, it is to be appreciated that other entropy sources may be employed.

The CPU 300 may also include a random number generator logic 330. The random number generator logic 330 may be based, for example, on an AES cipher, on a cryptographic hash function, on a keyed MAC function, and so on. While three bases for RNG logic 330 are described, it is to be appreciated that other approaches may be taken. The random number generator logic 330 may produce a first random number. The first random number may be based, at least in part, on a value provided by the counter entropy source 310, on a value provided by the arbitrary entropy source 320, and on a value provided by an external entropy source 350. The external entropy source 350 may be, for example, a CSRNG logic that provides a value (e.g., random number). The value provided by the CSRNG may be encrypted and stored in an EACM. The value stored in the EACM may be loaded into the CPU 300 when the CPU 300 is reset.

After producing the first random number, the random number generator logic 330 may produce subsequent random numbers. A subsequent random number 340 may be based, at least in part, on a value provided by the counter entropy source 310. The subsequent random number may also be based, at least in part, on a value provided by the arbitrary entropy source 320. The subsequent random number may also be based, at least in part, on a random number previously generated by the random number generator logic 330. Thus, a first random number is produced by random number generator logic 330 using a first set of three inputs including one external source. Subsequent random numbers are produced using different sets of values from two of the entropy sources used to produce the first random number and from a previously generated random number.

Figure 4:
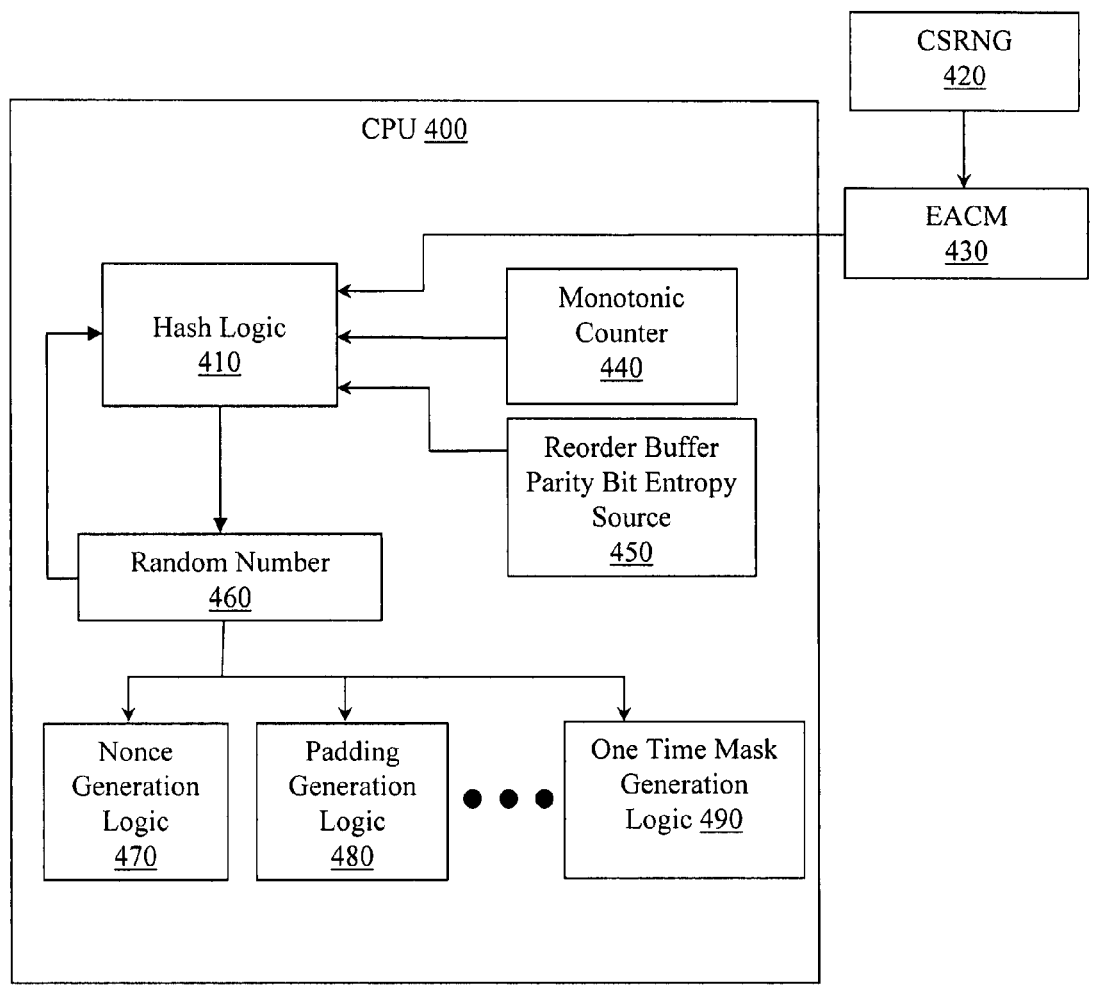
FIG. 4 is a block diagram illustrating a central processing unit (CPU) having at least some aspects of at least one embodiment of the invention.

FIG. 4 illustrates a CPU 400 that produces random numbers. The random numbers may be classified as being "cryptographically secure", which means the random numbers may be suitable for use in cryptography. CPU 400 may include a hash logic 410 that takes a first set of three inputs to generate a first random number. While a "hash logic" is described, it is to be appreciated that hash logic 410 may be more generally referred to as a random number generating logic. One of the first three inputs may be based, at least in part, on a value generated by a CSRNG 420. This value may be encrypted and stored in an EACM 430 at the time of system manufacture and loaded into the CPU 400 at system reset. Another of the first three inputs may be based, at least in part, on a value associated with a monotonic counter 440. Another of the first three inputs may be based, at least in part, on a value associated with parity bit processing associated with a reorder buffer in CPU 400. This source may be referred to as a reorder buffer parity bit entropy source 450. Thus, three inputs are available to create the first random number. In one embodiment, none of these three inputs are associated with platform sources of entropy. Thus, although CPU 400 may be part of a computing platform, CPU 400 does not rely on that computing platform for an entropy source.

The hash logic 410 inputs a subsequent set of three inputs to generate subsequent random numbers. The subsequent three inputs may include, for example, a value associated with the monotonic counter 440, a value associated with the reorder buffer parity bit entropy source 450, and a previously generated random number(s). A random number 460 generated by the hash logic 410 may be provided to logics including, for example, a nonce generation logic 470, a padding generation logic 480, a one time mask generation logic 490, and so on. While three downstream consumers of random number 460 are illustrated, it is to be appreciated that random number 460 may, additionally and/or alternatively, be stored in a memory, be written to a computer-readable medium, be displayed, and so on. While logics 470-490 are illustrated inside CPU 400, it is to be appreciated that logics 470-490 and/or other downstream consumers may be located outside CPU 400.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
   generating a first random number (RN) in a central processing unit (CPU) using a first set of three inputs comprising:
      an externally generated value (EGV);
      a value associated with an internal counter entropy source (ICES), and
      a value associated with an internal arbitrary entropy source (IAES), and
   generating subsequent random numbers in the CPU using a subsequent set of three inputs comprising:
      one or more previously generated random numbers,
      a value associated with the ICES, and
      a value associated with the IAES.

2. The method of claim 1, where the EGV is provided by a cryptographically secure random number generator (CSRNG), and where the EGV is encrypted and stored in an encrypted authentication code module (EACM), and where the EGV is loaded into the CPU upon determining that the CPU has been reset.

3. The method of claim 1, where the CPU is part of a computing platform, and where the CPU does not rely on the computing platform for an entropy source.

4. The method of claim 1, where random numbers are generated by applying one or more of, an AES cipher, a cryptographic hash function, and a keyed MAC function to a set of three inputs.

5. The method of claim 4, where the cryptographic hash function is the SHA256 function.

6. The method of claim 1, where the ICES is a monotonic counter.

7. The method of claim 1, where the value provided by the IAES is based, at least in part, on parity bits processed in a reorder buffer in the CPU.

8. The method of claim 1, including one or more of, providing a random number to a nonce generator, providing a random number to a padding generator, providing a random number to a one time mask generator, providing a random number to a secure channel establisher, writing a random number to memory, writing a random number to a computer-readable medium, and displaying a random number.

9. The method of claim 8, where:
the EGV is provided by a CSRNG;
the EGV is encrypted and stored in an EACM, where the EGV is loaded into the CPU upon determining that the CPU has been reset;
the random number is generated using the SHA256 cryptographic hash function;
the ICES is a monotonic counter;
the value proved by the IAES is based, at least in part, on parity bits processed in a reorder buffer in the CPU, and
where the subsequent random numbers are classified as cryptographically secure.

10. A central processing unit (CPU), comprising:
an ICES;
an IAES; and
a random number generator logic,
where the random number generator logic is to produce a first random number based, at least in part, on a first set of three values including a value provided by the ICES, a value provided by the IAES, and a value provided by an external entropy source,
where the random number generator logic is to produce a subsequent random number based, at least in part, on a second set of three values including a value provided by the ICES, a value provided by the IAES, and a random number previously generated by the random number generator logic, and
where the subsequent random number is classified as cryptographically secure.

11. The CPU of claim 10, the ICES being a monotonic counter.

12. The CPU of claim 11, where the IAES is to provide a value associated with parity bit processing performed by a reorder buffer located in the CPU.

13. The CPU of claim 12, the external entropy source being a CSRNG logic, the value provided by the CSRNG being encrypted and stored in an EACM.

14. The CPU of claim 13, where the random number generator logic is to produce a random number based on one or more of, an AES cipher, a cryptographic hash function, and a keyed MAC function.

15. The CPU of claim 14, including:
one or more of, a nonce generation logic, a padding generation logic, a one time mask generating logic, and a secure channel logic, and
where the random number generator logic is to provide a random number to one or more of, the nonce generation logic, the one time mask generating logic, the padding logic, and the secure channel logic.

* * * * *